No. 875,101.

PATENTED DEC. 31, 1907.

S. W. PEREGRINE.

AUTOMATIC VALVE.

APPLICATION FILED MAY 15, 1906. RENEWED NOV. 20, 1907.

Attest:
Edward W. Saxton

Inventor
Seymour W. Peregrine.
by Spear, Middleton, Donaldson & Spear
Attys.

UNITED STATES PATENT OFFICE.

SEYMOUR W. PEREGRINE, OF PORTLAND, MAINE.

AUTOMATIC VALVE.

No. 875,101.  Specification of Letters Patent.  Patented Dec. 31, 1907.

Application filed May 15, 1906, Serial No. 317,241. Renewed November 20, 1907. Serial No. 403,073.

*To all whom it may concern:*

Be it known that I, SEYMOUR W. PEREGRINE, a citizen of the United States, residing at Portland, Maine, have invented certain new and useful Improvements in Automatic Valves, of which the following is a specification.

My invention relates to improvements in automatic cut-off valves for pipes or mains carrying fluid under pressure, such for instance as water, steam, or gas.

The object of the invention is to provide a simple, economical, durable and efficient valve which may be easily set to remain open as long as any pre-determined pressure exists in the main or pipe, but which should the pressure drop to below the pre-determined point will automatically close and will remain closed until mechanically opened again, irrespective of whether or not the pressure in the main on the inlet side of the valve has been re-established.

With these and possibly other objects in view, the invention includes the features of construction and arrangement and combination of parts hereinafter described and particularly set forth in the appended claims.

The invention is illustrated in the accompanying drawings, in which,—

Figure 1:
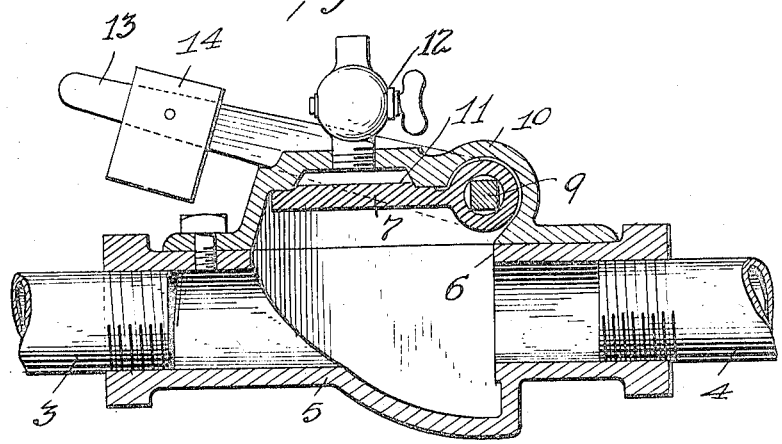
Figure 2:
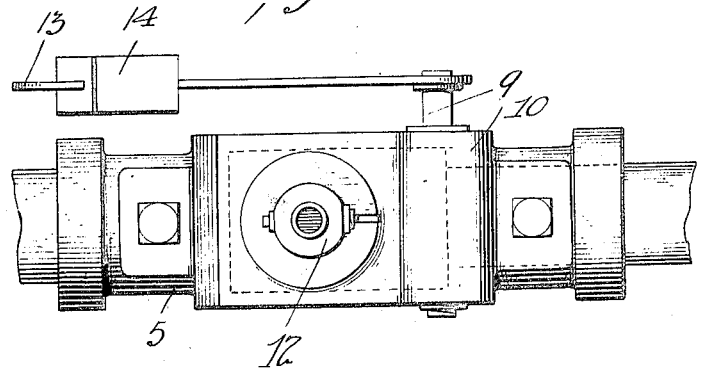

Figure 1 is a sectional elevation, and Fig. 2 a plan view.

In these drawings, the numeral 3 designates an inlet pipe which is representative of a service pipe for conveying any suitable fluid, such for instance as steam from a boiler, water from a city reservoir, or pumping station, or gas from any ordinary source of supply; and 4 designates the delivery pipe. These are connected by the valve casing 5, to which the pipes may be connected in any suitable manner. The valve casing is provided with a valve seat 6, which is designed to coact with the face 7 of a check valve pivoted upon a pin 9 in upward extension of the valve chamber. This upward extension 10 of the valve chamber is so shaped that the valve may be swung up into horizontal position, as shown in full lines in Fig. 1. It is provided with a recess portion 11 which has a vent opening preferably provided with a pet cock which is shown at 12, by which the space 11 is placed in communication with the outside air. The rear side of the check valve 8 is shaped so as to snugly fit against the edges of this opening and it will thus be seen that so long as the desired pressure exists within the main, the valve will be held pressed against the seat formed by the edges of the recess 11, as the space within the recess and behind the valve being in communication with the outside air, the fluid therein will be at atmospheric pressure.

In order that the valve may be adjusted for any pre-determined pressure a lever arm 13 is connected to a pin or shaft 9, upon which the check valve is mounted and this lever arm 13 is provided with an adjustable weight 14 which may be moved towards or from the axis of the valve. Suitable graduations may be placed on the lever arm to serve as a guide in adjusting the weight to set the valve for any desired pressure.

From the foregoing description it will be seen that I provide a very simple form of automatic valve which may be produced at an extremely low cost and which in case the pressure in the supply main should for any reason be cut off or lowered beyond safety point the valve will automatically close the service pipe so that upon re-establishing the pressure all danger of flow of fluid through open valves or burners connected with the service pipe will be avoided, as the valve can only be opened by manually operating the same.

Having thus described my invention what I claim is:—

A device for automatically cutting off the flow of liquid through a service pipe comprising a valve casing having an ingress opening upon one side and an egress opening upon the opposite side, said casing having a recess in the upper part thereof, a flap valve pivoted in said recess and arranged when open to lie wholly out of the line of the ingress and egress pipes and when dropped to close said egress pipe, and a vent in the wall of the recessed portion and a supplemental recess in said wall providing a space in rear of the valve which is closed against the escape of fluid from the casing by said valve while it is elevated said recess having inclined walls and said valve inclined shoulders corresponding thereto, substantially as described.

In testimony whereof, I affix my signature in presence of two witnesses.

SEYMOUR W. PEREGRINE.

Witnesses:
THOMAS L. TALBOT,
LYDIA H. BECK.